United States Patent [19]

Halmos et al.

[11] Patent Number: 4,660,206

[45] Date of Patent: Apr. 21, 1987

[54] CHIRP LASER STABILIZATION SYSTEM

[75] Inventors: Maurice J. Halmos, Los Angeles; David M. Henderson, Playa del Rey, both of Calif.

[73] Assignee: Hughes Aircraft Company, Los Angeles, Calif.

[21] Appl. No.: 627,147

[22] Filed: Jul. 2, 1984

[51] Int. Cl.[4] .............................................. H01S 3/10
[52] U.S. Cl. ........................................ 372/28; 372/12; 372/21; 372/32; 372/20
[58] Field of Search .................. 372/26, 29, 28, 32, 372/12, 20, 21

[56] References Cited

U.S. PATENT DOCUMENTS

| | | | |
|---|---|---|---|
| 3,431,514 | 3/1969 | Oshman et al. | 372/28 |
| 3,586,997 | 6/1971 | Kinsel | 372/29 |
| 3,713,042 | 1/1973 | Kinsel | 372/32 |
| 3,921,099 | 11/1975 | Abrams et al. | 372/32 |
| 3,965,440 | 6/1976 | Graves | 372/26 |
| 4,314,210 | 2/1982 | Everett | 372/28 |

Primary Examiner—Leon Scott, Jr.
Attorney, Agent, or Firm—Ronald L. Taylor; A. W. Karambelas

[57] ABSTRACT

A chirp laser system includes an intracavity electro-optical crystal modulated at a relatively high frequency, for example 250 kilohertz, to sweep the frequency of the transmitter laser above and below its nominal center frequency. One of the mirrors of the laser transmitter is adjustable to vary the length of the cavity and to shift the frequency of the transmitter laser. When the frequency of the transmitter laser is shifted, the output amplitude of the laser changes. With the center frequency of the laser at a maximum gain point, the amplitude of the output signals during positive and negative frequency excursions of the transmitter laser will be substantially symmetrical. However, if thermal or other effects cause the frequency of the laser to shift away from the maximum gain point, the output during positive and negative excursions will be asymmetrical. A small part of the output from the transmitter laser is sampled, and the amplitude during positive and negative frequency shift excursions is compared, using a square wave derived from the chirp modulating driver. Where the detected signals for the positive and negative frequency excursions are substantially equal, no change in the position of the mirror is accomplished; however, when the excursions result in a difference in the amplitude of the detected signals, the position of the piezoelectrically adjustable mirror is shifted to restore the nominal center frequency of the laser to its maximum amplitude point on the gain curve.

16 Claims, 5 Drawing Figures even though the sawtooth waves 26 and 28 are shown in FIG. 1 and are noted hereinabove to have a frequency of 250 kilohertz, this is merely illustrative, and these waves may have frequencies from less than 10 kilohertz to more than 1,000 kilohertz.

CHIRP LASER STABILIZATION SYSTEM

TECHNICAL FIELD

This invention relates to laser systems including intracavity modulating arrangements such as electro-optical crystals.

BACKGROUND OF THE INVENTION

It has been proposed heretofore to stabilize a laser, for example, a carbon dioxide laser system, at the center of the gain curve of a predetermined laser transition. This has been accomplished through the use of an adjustable mirror mounted on a piezoelectric transducer, so that the length of the cavity may be varied in accordance with signals applied to the piezoelectric transducer. The conventional manner of stabilization has been to dither the end mirror and to use the attendant output power fluctuation to generate a correction signal. However, these piezoelectric transducers are normally limited in frequency to about 1,000 cycles per second or 1 kilohertz. When attempts have been made to use this technique with lasers having intracavity electro-optic modulators, a stable condition at the center of the gain curve is not found because of the time varying heating of the electro-optic crystal due to the fluctuating power level in the dithered cavity; and as a result, the laser often locks at a frequency offset from the desired center of the gain curve.

Accordingly, a principal object of the present invention is to stabilize the transmitter laser in laser systems such as radar systems employing intracavity modulation, by electro-optic crystals or the like.

SUMMARY OF THE INVENTION

In accordance with the present invention, a small portion of the output of a laser system having intracavity modulation is sampled and detected. A modulation driver applies signals to the intracavity modulation element to shift the frequency of the laser above and below its nominal center frequency, which should be at the center of the gain curve of the laser. The output from the detector circuit is combined with a reference signal derived from the modulation driver to determine whether there is a change in amplitude of the laser during positive frequency excursions, as compared with negative frequency excursions. If the amplitude during each of these time periods is the same, then no change in the adjustable mirror is made; however, if the gain is significantly greater for frequency excursions in one direction as compared with the gain during frequency excursions in the opposite direction, a signal of appropriate polarity is applied to the electro-mechanical transducer controlling the position of the mirror to change the length of the laser cavity and restore the nominal center frequency of the transmitter laser at the center of the gain curve.

In the implementation of the arrangements outlined above, the system may include the chirp modulation driver which characteristically may operate to drive the electro-optical modulator (such as a piezoelectric crystal) at a frequency above 10 kilohertz (e.g., 250 kilohertz) and, following detection, the signal from the output of the lazer may be processed by a band pass filter to pass signals of a frequency range from at least the chirp driver primary frequency through the second harmonic of the detected signal (e.g., approximately 250 kilohertz through 500 kilohertz band pass) and the resultant output is combined with a square wave reference signal derived from the chirp modulator driver in a multiplier, which essentially provides a positive signal having an amplitude equal to the detected signals for one direction of frequency excursion, and negative signals having an amplitude equal to the detected signals during frequency excursions in the opposite direction, with the resultant signals being passed through a low pass filter and integrated, to provide a dc signal to be applied to the piezoelectric transducer, having a magnitude and polarity such as to restore the laser to the center frequency at the center of the gain curve.

The use of the chirp signal itself as the dithering signal results in an inherently simple system which avoids the problems encountered with the use of conventional low frequency stabilizing circuits. The need for a separate low frequency dither signal generator, to dither the piezoelectric crystal, is eliminated as are the crystal heating problems associated with low frequency dither stabilization.

Other objects, features and advantages of the invention will become apparent from a consideration of the following detailed description and from the accompanying drawings.

DETAILED DESCRIPTION OF THE INVENTION

Figure 1:
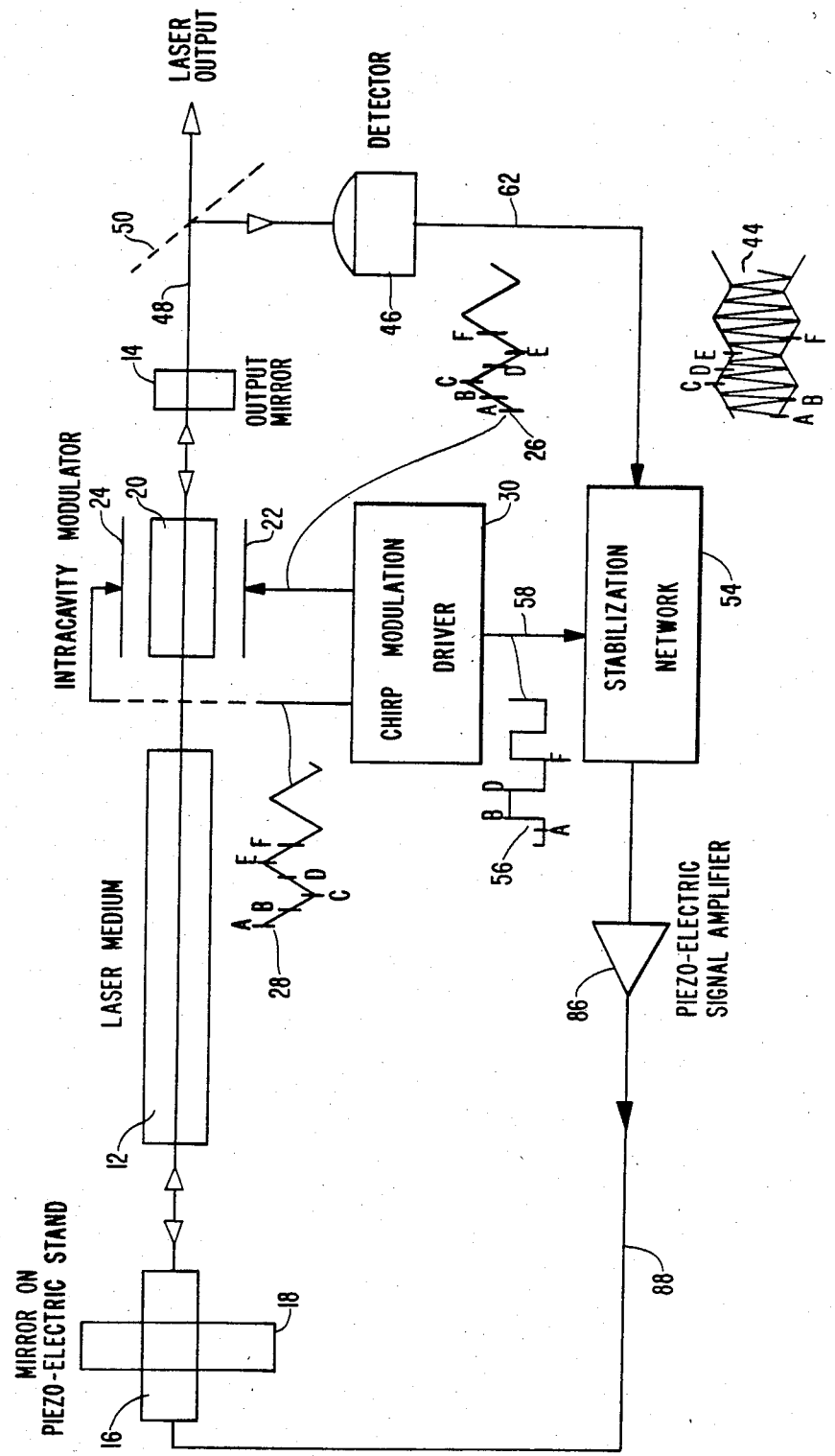
FIG. 1 is a block circuit diagram of a chirp laser transmitter illustrating the principles of the present invention.

Referring more particularly to the drawings, the chirp laser transmitter is shown schematically toward the top of FIG. 1, with the laser medium 12 being provided with output mirror 14, and a second mirror 16 mounted on a piezoelectric stand 18 to provide the two ends of the laser cavity. An electro-optical crystal 20 having electrodes 22 and 24 is mounted within the laser cavity to sweep the frequency thereof. The laser may be a carbon dioxide laser.

While the present invention is not limited to chirp radar laser transmitters employing carbon dioxide, a complete system and many prior art references relating to such systems are disclosed in a prior U.S. patent application Ser. No. 476,288, filed Mar. 17, 1983, and a continuation-in-part patent application Ser. No. 627,704 filed July 3, 1984 both of which are assigned to the assignee of the present invention.

In practice, two sawtooth waves 26 and 28 which may each have a magnitude of several hundred volts, may be applied to the cadmium telluride electro-optical crystal 20, through the electrodes 22 and 24, respectively, by the chirp modulation driver 30. In one illustrative example, the sawtooth waves 26 and 28 each have a frequency of approximately 250 kilohertz. However, higher or lower frequencies may, of course, be employed.

With the electro-optical crystal 20 being driven as outlined above, with the linear out-of-phase sawtooth waves 26 and 28, the output frequency of the laser is frequency modulated in a linear manner by approximately 50 megahertz above and below the nominal center frequency of the laser. In the plots 26 and 28 showing the voltages applied to the two electrodes of the electro-optical crystal, successive points along the line segments of the plots have been designated by the letters A, B, C, D, E, and F. The points A, C, E, etc. represent the maximum and minimum voltages applied to the electro-optical crystal, and accordingly, the maximum frequency excursions of the output signals from the transmitter laser. Accordingly, from point B to point D, the output frequency will be above the nominal frequency of the laser, while from point D to point F, the laser will have an output frequency below the nominal center frequency.

Figure 2:
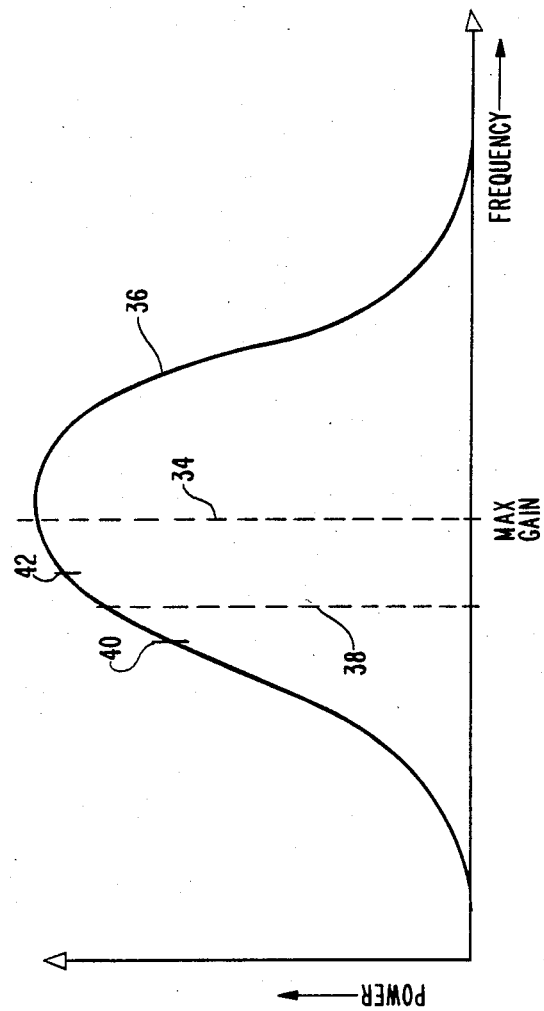
FIG. 2 is a graph showing the gain of a laser transmitter, with the output power plotted against frequency.

FIG. 2 is a graph showing the output power of the laser plotted against frequency. Line 34 extending through the center of the characteristic 36 represents the frequency at which the gain of the laser is a maximum, and this is the desired center frequency of the laser. As mentioned above, by shifting the position of the mirror 16, the frequency of the laser with respect to desired line center 34 may be changed.

Now, in the event that the laser is operating at the frequency indicated by the dashed line 38, it will be away from the desired center line 34, and with frequency excursions, for example, to points 40 and 42, the magnitude of the transmitted output signal will vary. This is indicated in FIG. 1 by the plot 44 at the output of detector 46 which receives a very small fraction of the output 48 from the laser, through the use of a partially silvered mirror 50, or be other similar known techniques for deriving a small fraction of a light beam. It may be noted that at points A, C, and E the envelope has maxima and minima corresponding to the maximum frequency excursions away from the centerline 38, as shown in FIG. 2, to points 40 and 42. In the event that the laser was operating at the desired maximum gain point, the center frequency indicated by line 34 in FIG. 2, then the detected signals would have a different configuration, and would drop off equally and slightly at the points of maximum frequency excursion either above or below the line 34 and the detected signals would be equal in amplitude during successive half cycles.

The stabilization network 54 now processes the detected signals of the type shown at 44. More specifically, in the stabilization network, the detected signals are examined to determine whether the signals which are produced during positive frequency excursions are greater than, less than, or precisely equal to, those produced during negative frequency excursions. This is accomplished by the utilization of the gating square wave pulse train indicated schematically at 56 which is supplied on lead 58 from the chirp modulation driver 30 to the stabilization network 54. Thus, in a manner to be disclosed in greater detail in connection with FIG. 4, the pulse train 56 has positive and negative going pulses which correspond respectively to the positive and negative frequency excursions of the laser output, and this square wave pulse format is employed to examine successive sections of the detected signals such as those shown at 44 in FIG. 1.

Figure 3:
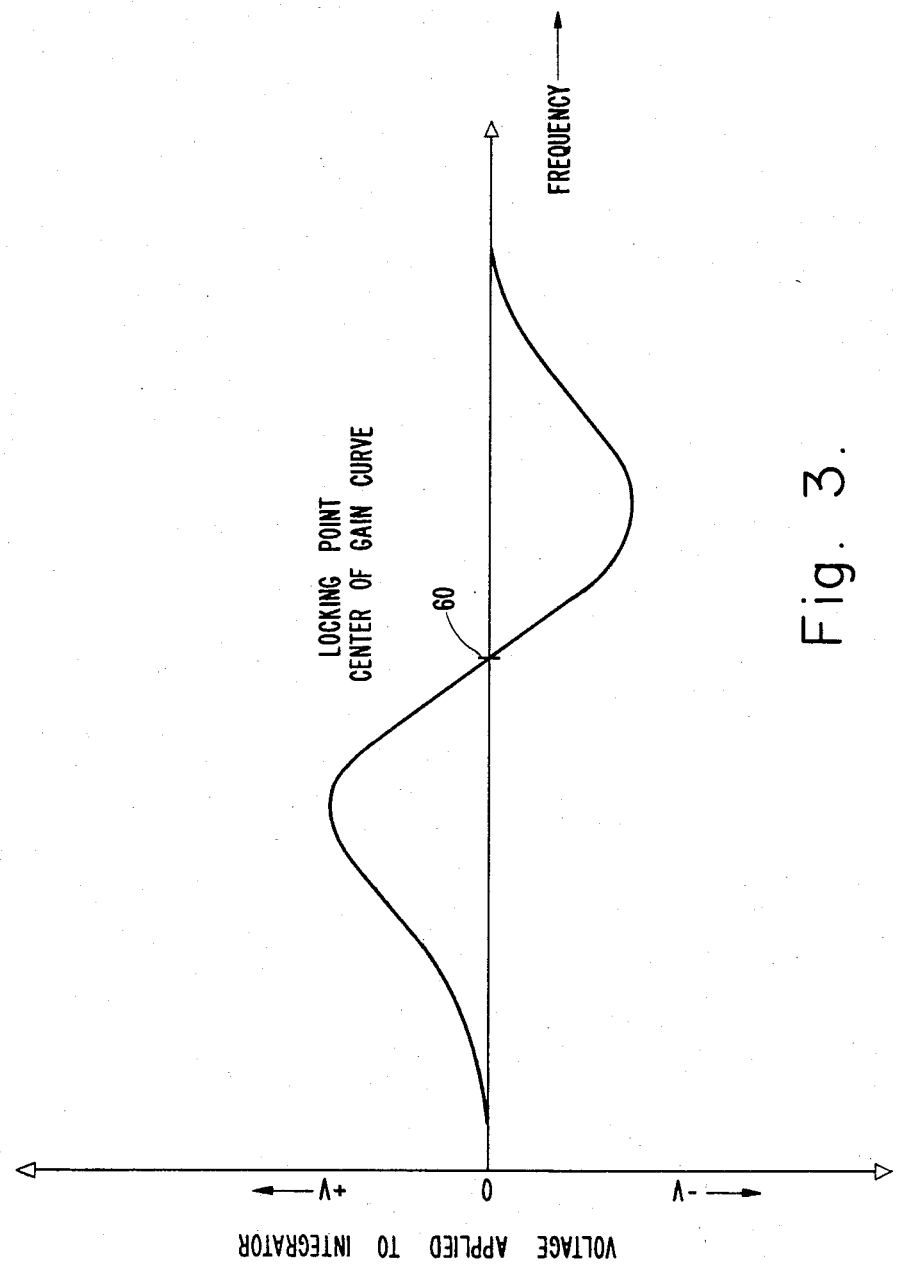
FIG. 3 is a graphic diagram showing the correcting voltage applied to the integrator as a function of the nominal center frequency at which the laser transmitter is operating.

The output from the stabilization network 54 is shown in FIG. 3, and corresponds essentially to a discriminator output with positive and negative outputs which increase with departure from the center point 58, as the frequency increases or decreases. Accordingly, referring back to FIG. 2, the mirror 60 will be shifted in position, to restore the nominal center frequency of the transmitter laser from the frequency indicated by line 38, to that indicated by line 34 at the desired maximum gain frequency.

Figure 4A:
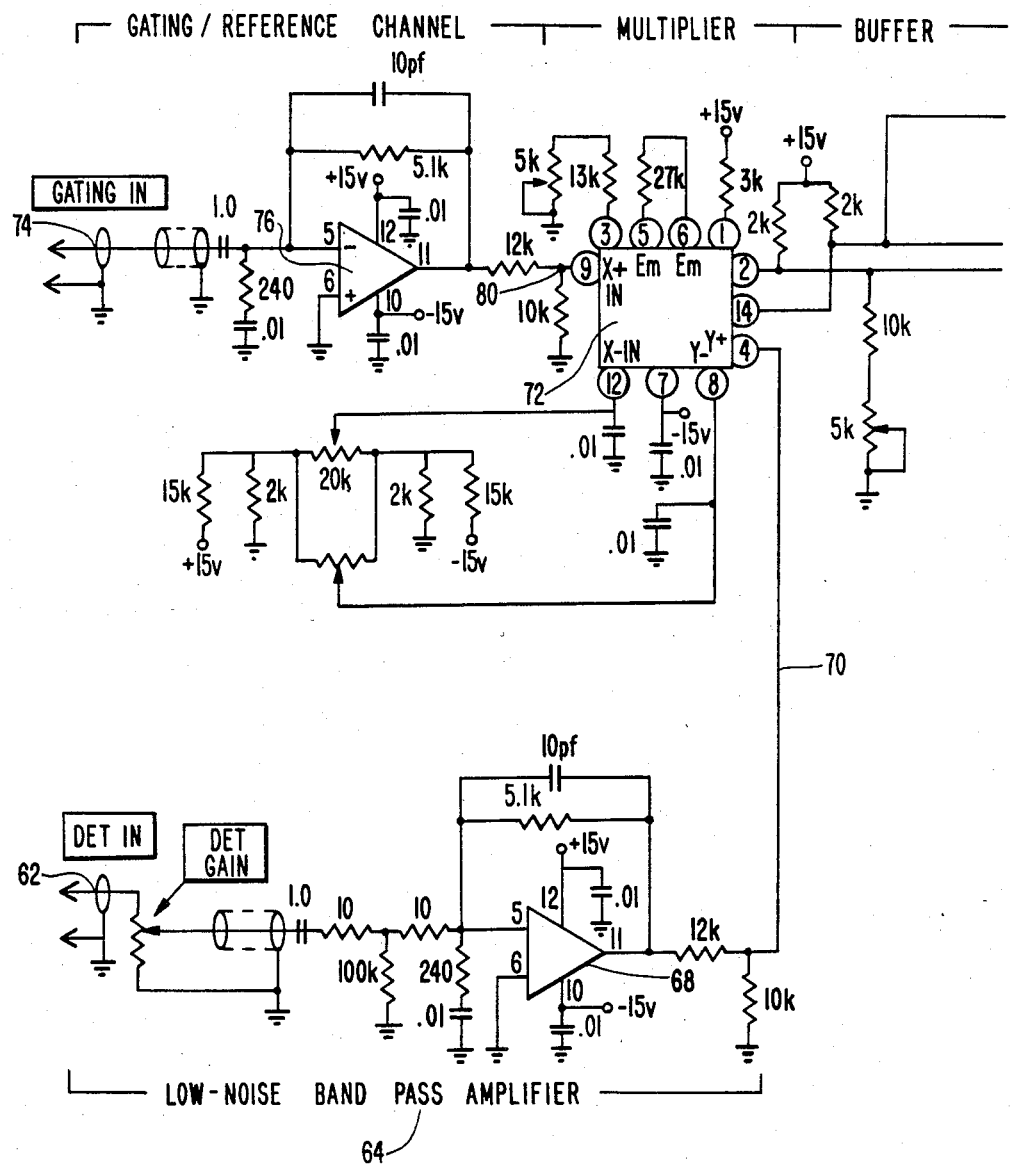
FIGS. 4a–4b are a detailed circuit diagram showing one implementation of the stabilization circuitry which may be employed to implement the block circuit diagram of FIG. 1.
Figure 4B:
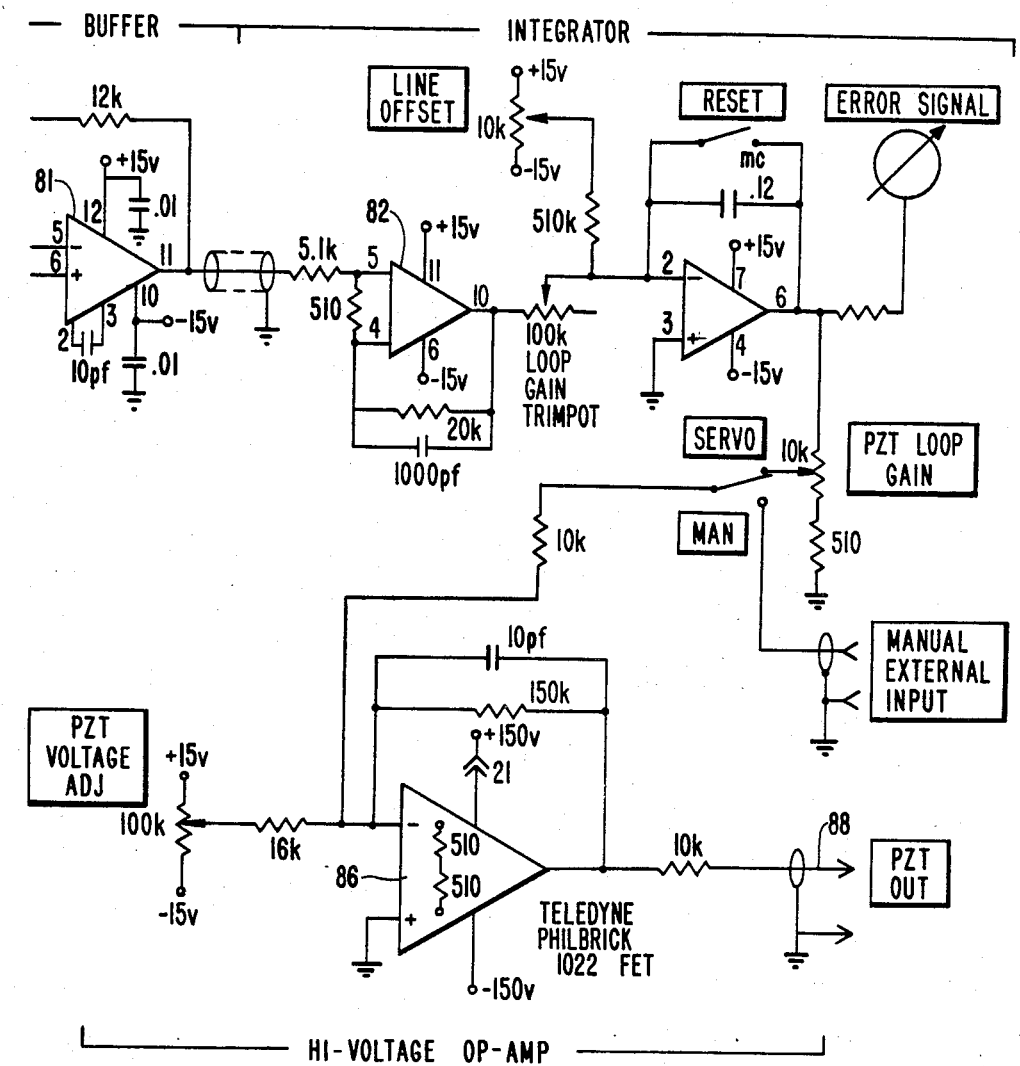

FIGS. 4a-4b show one detailed circuit diagram for implementing the stabilization network 54 of FIG. 1. More specifically, the detected signals are received on coaxial input lead 62 at the lower left in FIG. 4 and are applied to the band pass filter 64. From the band pass filter 64 which may pass signals including the fundamental 250 kilohertz through the second harmonic of 500 kilohertz, the detected signals are amplified by amplifier 68 and applied on lead 70 to the multiplier 72. Gating signals 56 from the chirp modulation driver 30 are applied on coaxial lead 74 to amplifier 76 and through leads 80 to the multiplier 72. The multiplier 72 provides positive output signals proportional to the amplitude of the signals during positive frequency excursions; and the negative output signals proportional to the amplitude of signals 44 during negative going frequency excursions, and these are amplified in circuit 82, and integrated in circuit 84. The resultant signal, corresponding to that shown in FIG. 3, is applied to the piezoelectric transducer amplifier 86, and the output signal on lead 88 is supplied to the piezoelectric stand 18 which controls the mirror 16.

Concerning the history of the development of the present invention, as mentioned above, it has been known to stabilize laser oscillators through the use of piezoelectric transducers which position the mirror at one end of the laser cavity. This practice involved the dithering or driving of the mirror at a frequency of up to one kilohertz. Accordingly, when the transmitter laser of a chirp laser transmitter required stabilization, the natural step was to attempt to provide such conventional stabilization. However, as noted above, the change in laser power which occurs as the resonance frequency was shifted along the gain curve produced a fluctuation in the temperature of the chirp laser electro-optical modulating crystal, which changed its index of refraction. This in turn produces a change in resonance so that a feedback loop was produced, and the result was that the laser would not lock up reliably at the desired maximum power point.

The solution, as set forth in the detailed description, involved the recognition that the chirp laser transmitter with its linear frequency swept signal, albeit at a very high frequency on the order of 250 kilohertz, would also produce collateral variations in amplitude at this high frequency. Accordingly, a workable stabilization system could be produced by eliminating the low frequency dithering of the piezo-electric crystal, and providing high frequency circuitry for analyzing the very rapid changes in amplitude of the chirped laser output as the frequency was swept above and below the nominal center frequency, and shifting the position of the piezoelectrically controlled mirror in accordance with the detected and analyzed signals. Successful results were achieved without a separate piezoelectric transducer dithering circuit which previously was considered to be an integral part of a stabilization system.

It is to be understood that the foregoing detailed description and the accompanying drawings merely relate to one illustrative embodiment of the invention. Various changes and alternative arrangements may be included without departing from the spirit and scope of the invention. Thus, by way of example and not of limitation, instead of the particular logic circuit and detailed electronics which have been shown in FIG. 4, other alternative arrangements for accomplishing the same functions may be included. In addition, the present invention is applicable to various types of laser radar systems including the systems having a local oscillator and homodyne radar system; further, the principles of the present invention are applicable to the stabilization of other laser systems apart from chirp laser radar transmitters. Accordingly, the present invention is not limited to that precisely as shown in the drawings and as described in the foregoing detailed description.

What is claimed is:

1. A chirp modulated laser transmitter system comprising:
   a transmitter laser having an output with a nominal amplitude at a nominal center frequency of oscillation;
   intracavity electro-optical crystal means for varying the output frequency of said transmitter laser from said nominal center frequency in response to a driving signal;
   chirp modulation driver means for driving said electro-optical crystal at a relatively high frequency above 10 kilohertz to linearly shift the output of said laser above and below said center frequency;
   means for detecting asymmetry in the amplitude of the output of said laser as it is shifted in frequency above and below the nominal center frequency thereof;
   said transmitter laser including an adjustable mirror at one end thereof; and
   means for varying the position of said adjustable mirror to shift the center frequency of said transmitter laser, in response to detected asymmetry in the amplitude of the output of said detecting means, to minimize said asymmetry and thereby stabilize the laser center frequency substantially at the frequency providing maximum output power.

2. A laser transmitter system as defined in claim 1 wherein said system includes a piezoelectric stand for varying the position of said mirror.

3. A laser transmitter system as defined in claim 1 wherein said chirp modulation driver means has an operating frequency above 200 kilohertz.

4. A laser transmitter system as defined in claim 1 wherein said electro-optical crystal is a cadmium telluride crystal having two electrodes, and wherein said chirp modulation driver means applies two linear sawtooth waves which are 180 degrees out of phase to said two electrodes.

5. A laser transmitter system as defined in claim 1 wherein said means for detecting laser output amplitude asymmetry includes a low pass filter having an input and output, a photodetector having an output connected to the input of said low pass filter, multiplier means connected to the output of said low pass filter for separating output signals occurring during positive frequency excursions from output signals occurring during negative frequency excursions, and an integrator for receiving the output from said multiplier, and circuit means for applying the output from said integrator to the adjustable mirror positioning means.

6. A laser transmitter system as defined in claim 5 wherein said low pass filter has a pass band extending to at least twice the frequency of said chirp modulation driver means.

7. A laser transmitter system as defined in claim 5 including means for applying a square wave signal to said multiplier from said chirp modulation driver means with the positive going pulses of said square wave being synchronized with frequency excursions of one polarity and the negative going portions of said square wave being synchronized with frequency excursions of the opposite polarity.

8. A laser transmitter system as defined in claim 1 including means for obtaining a small portion of the transmitter laser output and supplying it to said detecting means.

9. A laser system comprising:
   a laser having an output with a nominal amplitude at a nominal center frequency of oscillation;
   intracavity modulation means for varying the output frequency of said laser from said nominal center frequency in response to a driving signal;
   means for driving said intracavity modulation means at a relatively high frequency above 10 kilohertz to shift the output of said laser above and below said center frequency;
   means for detecting asymmetry in the amplitude of the output of said laser as it is shifted in frequency above and below the nominal center frequency thereof;
   said laser including an adjustable mirror at one end thereof; and
   means for varying the position of said adjustable mirror to shift the nominal center frequency of said laser, in response to detected asymmetry in the output of said detecting means, to thereby stabilize the laser frequency substantially at the frequency providing maximum output power.

10. A laser system as defined in claim 9 wherein said system includes a piezoelectric stand for varying the position of said mirror.

11. A laser system as defined in claim 9 wherein said driving means has an operating frequency above 200 kilohertz.

12. A laser system as defined in claim 9 wherein said modulation means is a cadmium telluride crystal having two electrodes, and wherein said driving means applies two symmetrical waves which are 180 degrees out of phase to said two electrodes.

13. A laser system as defined in claim 9 wherein said means for detecting asymmetry includes a low pass filter having an input and output, a photodetector having an output connected to the input of said low pass filter, multiplier means connected to the output of said low pass filter for separating output signals occurring during positive frequency excursions from output signals occurring during negative frequency excursions, and an integrator for receiving the output from said multiplier, and circuit means for applying the output from said integrator to the adjustable mirror positioning means.

14. A laser system as defined in claim 13 wherein said low pass filter has a pass band extending to at least twice the frequency of said driving means.

15. A laser system as defined in claim 13 including means for applying a square wave signal to said multiplier from said driver means with the positive going pulse of said square wave being synchronized with frequency excursions of one polarity and the negative going portions of said square wave being synchronized with frequency excursions of the opposite polarity.

16. A laser system defined in claim 9 including means for obtaining a small portion of the laser output and supplying it to said detecting means.

* * * * *